June 27, 1950

R. B. BOURNE ET AL 2,513,229

MANIFOLD SILENCER WITH PLURAL LATERAL
INLETS AND OUTLETS

Filed May 5, 1945

INVENTOR
ROLAND B. BOURNE
BY ARTHUR E. CHASE
Chapin & Neal
ATTORNEYS

INVENTOR
ROLAND B. BOURNE
ARTHUR E. CHASE
BY
ATTORNEYS

June 27, 1950  R. B. BOURNE ET AL  2,513,229
MANIFOLD SILENCER WITH PLURAL LATERAL
INLETS AND OUTLETS Filed May 5, 1945  4 Sheets-Sheet 4

INVENTOR
ROLAND B. BOURNE
ARTHUR E. CHASE
BY Chapin & Neal
ATTORNEYS

Patented June 27, 1950

2,513,229

UNITED STATES PATENT OFFICE 2,513,229

MANIFOLD SILENCER WITH PLURAL LATERAL INLETS AND OUTLETS

Roland B. Bourne, West Hartford, and Arthur E. Chase, Elmwood, Conn., assignors to The Maxim Silencer Company, Hartford, Conn., a corporation of Connecticut Application May 5, 1945, Serial No. 592,196

2 Claims. (Cl. 181—40)

This invention relates to improvements in silencers particularly intended to be attached directly to the exhaust ports of an internal combustion engine without the intervention of a manifold. In other words, the silencer acts as a manifold as well as performing its usual functions. Such devices are of particular value in connection with Diesel railway locomotives, in which space is at a premium and an exhaust manifold must be used in any case. Ordinary types of silencer are not fitted for this type of work.

The invention will now be described with relation to the accompanying drawings in which Fig. 1 is a section, on line 1—1 of Fig. 2, of one embodiment of the invention in which the inlet and outlet pipes lie in the same plane;

In general silencers constructed in accordance with the present invention are characterized by an elongated shell into one side of which inlet pipes may enter directly from the ports of the engine. A longitudinal partition, which may assume various forms, divides the casing into two chambers separated transversely of the casing, into one of which the inlet pipes enter and into the other of which enters one or more exhaust pipes from either the side or the end of the casing depending upon the conditions under which the silencer is to be installed. One or more transfer conduits pass from the inlet to the exhaust chamber through the partition in such a way that the gas is not allowed to pass directly from the inlet pipes into the transfer pipes or from the latter into the exhaust pipes, but so that expansion of the gas and a breaking up of the pulses occur in the two chambers. The form which the longitudinal partition and the transfer conduits may take may be varied considerably as will be shown in the following modifications.

Figure 1:
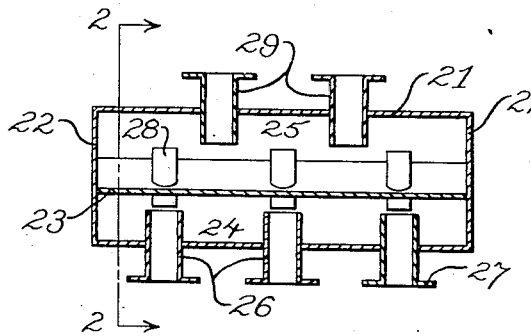
Figure 2:
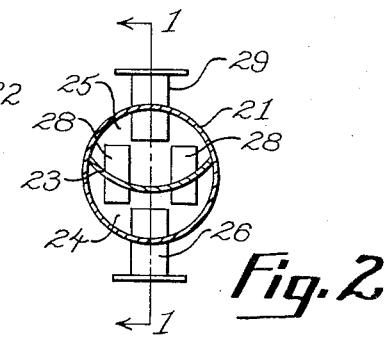
Fig. 2 is a section on line 2—2 of Fig. 1.

Figs. 1 and 2 show a cylindrical casing 21, closed by end headers 22 and having a longitudinal partition 23, arcuate in cross section both for strength and to permit expansion under heat. The interior of the casing is thus divided into two chambers 24 and 25 which serve respectively as inlet and outlet chambers. A plurality of inlet conduits 26, corresponding in number to the cylinders to which the silencer is to be attached, are provided with flanges 27 to be secured to the ports of the cylinders and pass through the casing 21 into chamber 24. Since the cylinders do not fire simultaneously each one has substantially the total volume of the chamber 24 available to it. Transfer tubes 28, here shown as arranged in two sets, each three in number, are positioned out of line with the inlet pipes and pass through the partition 23. Outlet pipes 29, here shown as two in number, are staggered with respect to the transfer tubes and open into the outlet chamber 25.

Figure 3:
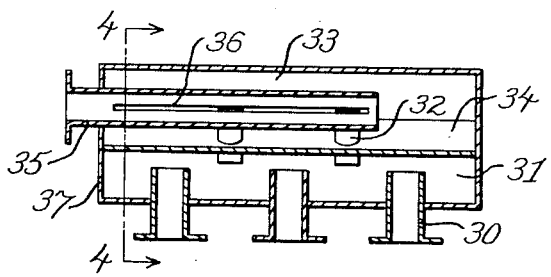
Fig. 3 is a section, on line 3—3 of Fig. 4, showing a construction in which inlet and outlet are from the side and end respectively.
Figure 7:
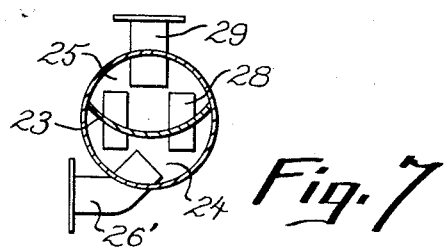
Fig. 7 is a section similar to Fig. 2, showing a variant construction where inlet and outlet are to be spaced at right angles.

This construction provides two chambers for silencing action without requiring much space laterally of the engine, since the longer dimension of the silencer extends longitudinally of the locomotive. In this and other modifications the inlet and outlet pipes, particularly when of any substantial length, may be provided with lateral escape openings such as a slot as shown in Fig. 3, and the transfer tubes may be provided with antiresonance apertures of a size and spacing as fully set forth in the patent to R. B. Bourne, 2,297,046, September 29, 1942. Fig. 7 shows a modification similar in all respects except that the inlet pipes 26 are curved to permit the inlet and outlet conduits to be at right angles.

Figure 4:
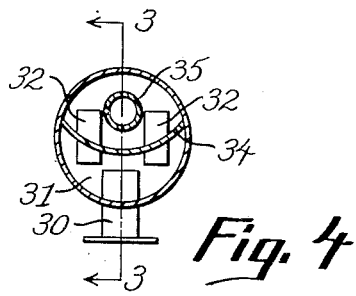
Fig. 4 is a section on line 4—4 of Fig. 3.

Figs. 3 and 4 show a modification in which the inlet pipes 30 extend laterally into an inlet chamber 31 and transfer tubes 32 pass from this chamber into an outlet chamber 33 through an arcuate partition 34. This construction is substantially like the preceding case except that the transfer tubes are shown in two sets of two each. A single outlet conduit 35, provided with a slot 36, in this case extends longitudinally of the silencer and passes out through the end header 37. This construction is of particular value where the exhaust pipe is to discharge to the rear of the locomotive.

Figure 5:
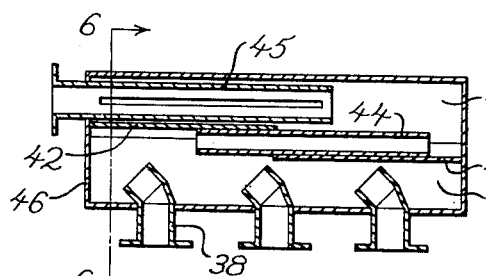
Fig. 5 is a section, on line 5—5 of Fig. 6, of a modified construction.
Figure 6:
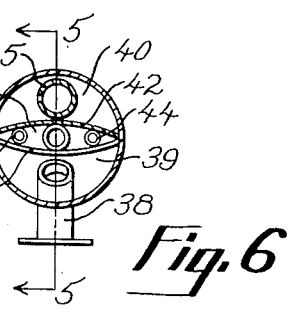
Fig. 6 is a section on line 6—6 of Fig. 5.
Figure 14:
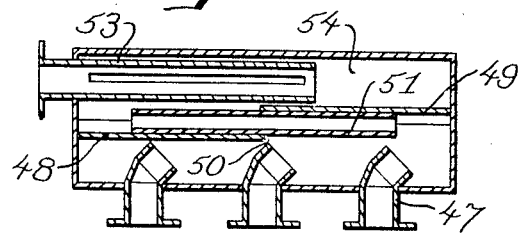
Fig. 14 is a longitudinal section showing a modification of the construction shown in Figs. 5 and 6.

Figs. 5 and 6 show three inlet pipes 38 as before, but these are preferably inclined within the silencer so as to discharge towards one end of the inlet chamber 39. This chamber is separated from the outlet chamber 40 by a pair of reversely curved arcuate partitions 41 and 42 each extending substantially to the center of the silencer and joined by a lune-shaped partition 43. Through this partition pass longitudinally disposed transfer tubes 44, which may be of differing sizes as shown. The partitions 41, 42 and 43 are preferably so disposed as to permit the transfer tubes to open into that end of the inlet chamber toward which the inlet pipes 38 are directed. An outlet pipe 45 extends longitudinally through end header 46, opening towards that end of the outlet chamber 40 into which the transfer tubes open. A modification of this structure is shown in Fig. 14 in which the inlet pipes 47 as before and the partitions 48, 49 and 50 are arranged so that the transfer tubes 51 open into that end of the inlet chamber 52 toward which the inlet gases are directed. The outlet pipe 53, however, is in this instance positioned to open into the opposite end of the exhaust chamber 54 from that into which the transfer tubes open. This gives a longer gas flow in the outlet chamber and a double reversal of flow which in some cases increases the silencing effect. These two constructions are of value in increasing the permissible length of the transfer tubes, which should be a substantial fraction of the length of the silencer as shown.

Figure 8:
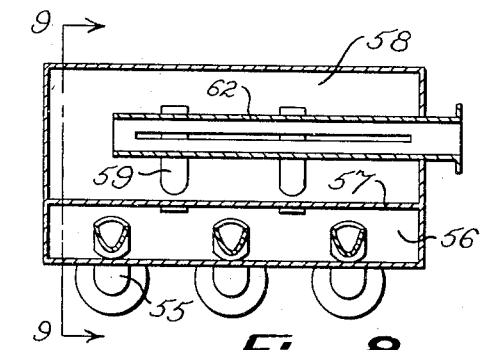
Fig. 8 is a section, on line 8—8 of Fig. 9, of a modification having utility as a spark catcher as well as a silencer and a manifold.
Figure 9:
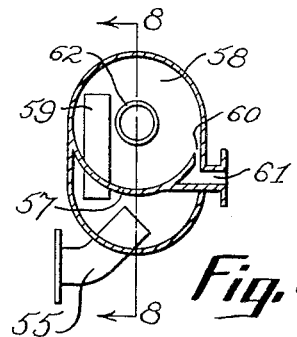
Fig. 9 is a section on line 9—9 of Fig. 8.

The form shown in Figs. 8 and 9 embodies the same general principles, but is designed to permit combination of silencing action with a spark arresting function. The inlet pipes 55 enter an inlet chamber 56 divided by an arcuate partition 57 from an outlet chamber 58. The latter chamber is made approximately cylindrical. Through the partition pass one or more (two as shown) transfer tubes 59 so positioned as to discharge gas substantially tangentially of the outlet chamber. The whirling action thus imparted to the gases causes any entrained solid particles to be thrown outwardly so that they can pass out through a longitudinal slot 60 into a pipe 61 leading to a suitable dirt trap. The outlet pipe 62 is in this case positioned longitudinally of the outlet chamber substantially along its axis so as to offer the least resistance to the whirling of the gases.

Figure 10:
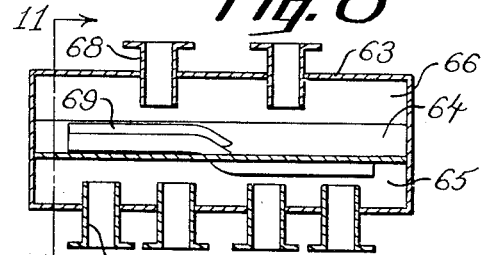
Fig. 10 is a section, on line 10—10 of Fig. 11, of a further modification.
Figure 11:
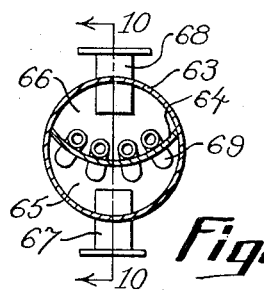
Fig. 11 is a section, on line 11—11 of Fig. 10, of a further modification.
Figure 12:
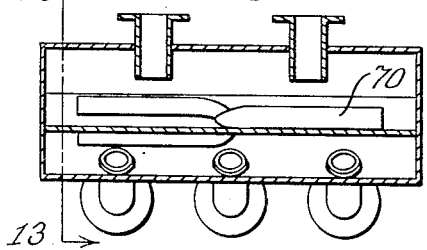
Fig. 12 is a section, on line 12—12 of Fig. 13, of a further modification.
Figure 13:
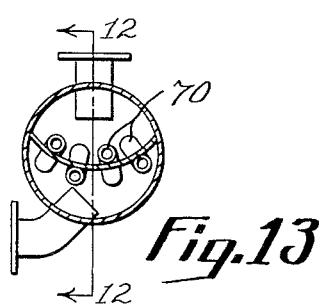
Fig. 13 is a section on line 13—13 of Fig. 12.

Figs. 10 to 13 represent two forms of a construction similar in purpose to those of Figs. 3, 4 and 13 but with the passage of the transfer tubes from one side to the other of the partition obtained by offsetting the tubes rather than the partition. Referring first to Figs. 10 and 11, the cylindrical casing 63 is divided by a longitudinally extending arcuate partition 64 into an inlet chamber 65 and an outlet chamber 66. Inlet pipes 67 extend into the former chamber and outlet pipes 68 extend into the latter. A series of transfer tubes 69 are offset at an intermediate point so that they may pass through the partition and yet remain generally parallel to the axis of the casing. In the form shown in Figs. 10 and 11 the tubes are all bent in the same direction, while the tubes 70 in Figs. 12 and 13 are bent alternately in opposite directions so that the gas flow is from both ends of the inlet chamber to both ends of the outlet chamber rather than from one end of the former to one end of the latter as in Figs. 10 and 11.

Figure 15:
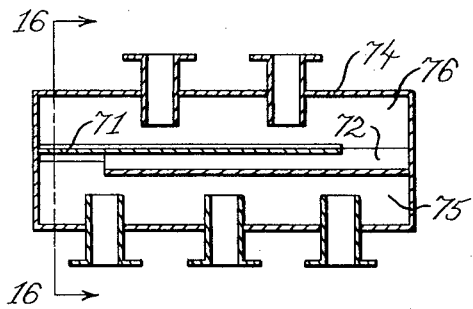
Fig. 15 is a section, on line 15—15 of Fig. 16, showing a further modification.
Figure 16:
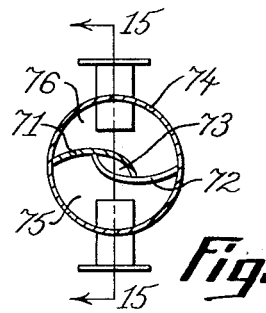
Fig. 16 is a section on line 16—16 of Fig. 15.

A manner of forming the partition so as to avoid the necessity of using separate transfer tubes is shown in Figs. 15 and 16. In this instance the partition is formed of two oppositely curved overlapping plates 71 and 72 welded together where they touch. Due to the reverse curvature a passage 73 is formed between the overlapping portions of the plates, and by having the plates shorter than the casing 74 this passageway is made to open at one end into the inlet chamber 75 and at the other into the outlet chamber 76. It will be understood in this and other forms that the inlet and outlet conduits may be arranged in any desired way.

Figure 17:
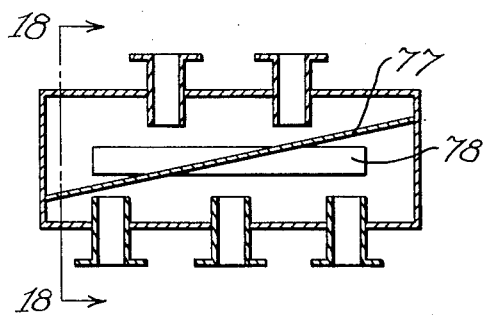
Fig. 17 is a section, on line 17—17 of Fig. 18, of a modification using a slanting partition.
Figure 18:
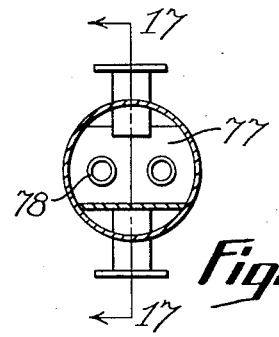
Fig. 18 is a section on line 18—18 of Fig. 17.

It is not necessary that the partition be arcuate as in the forms previously described. Thus in Figs. 17 and 18 the partition 77 is made of a flat sheet but is arranged on a slant so that the transfer tubes 78 may pass through it and remain parallel to the axis of the casing.

Figure 19:
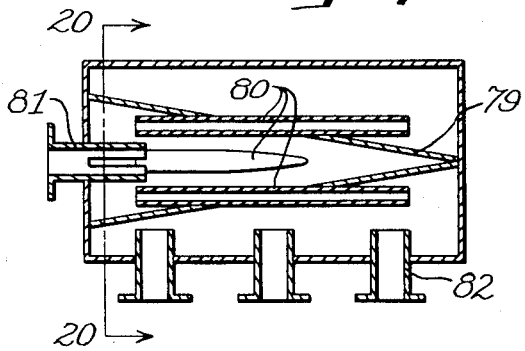
Fig. 19 is a section on line 19—19 of Fig. 20, of a modification using a conical partition.
Figure 20:
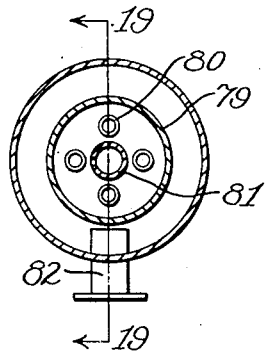
Fig. 20 is a section on line 20—20 of Fig. 19.
Figure 21:
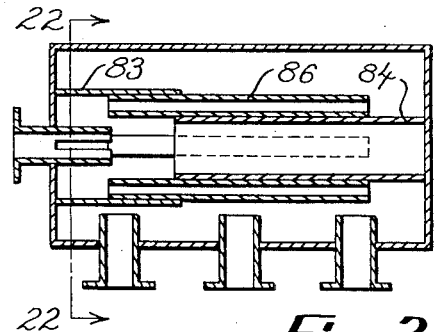
Fig. 21 is a longitudinal section, on line 21—21 of Fig. 22, of a modification using a stepped cylindrical partition.
Figure 22:
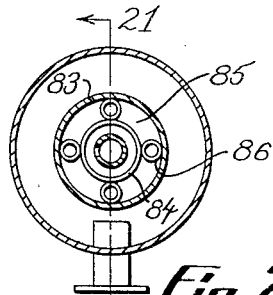
Fig. 22 is a section on line 22—22 of Fig. 21.

In Figs. 19 and 20 the partition 79 is conical and the transfer tubes 80 are parallel to the axis as before. While this form is restricted to cases where the exhaust pipe 81 can extend longitudinally of the locomotive it has the advantage that hot gas from the inlet pipes 82 heats the entire casing and not just one transverse side of it, so that any tendency of the casing to buckle on a longitudinal curve is avoided. A somewhat similar construction having the same advantage is shown in Figs. 21 and 22, in which the partition is formed by two cylindrical shells 83 and 84 of differing diameters, joined by an annular header 85 through which the transfer tubes 86 pass.

Figure 23:
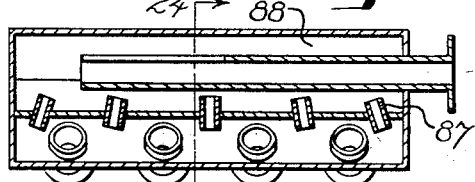
Fig. 23 is a longitudinal section, on line 23—23 of Fig. 24, of a modification of the form shown in Fig. 3.
Figure 24:
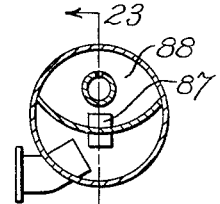
Fig. 24 is a section on line 24—24 of Fig. 23.

The modification of Figs. 23 and 24 is somewhat similar to that of Figs. 3 and 4 but has the additional feature that the transfer tubes 87 are all directed towards the center of the outlet chamber 88.

Figure 25:
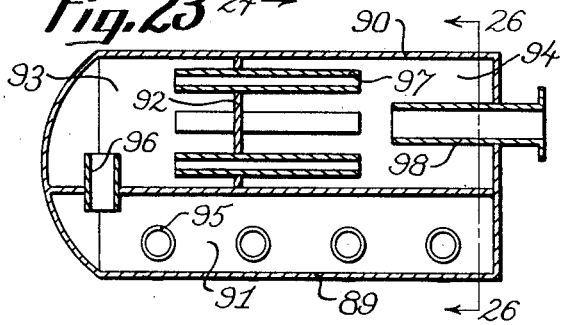
Fig. 25 is a longitudinal partition, on line 25—25 of Fig. 26, of a further modification.
Figure 26:
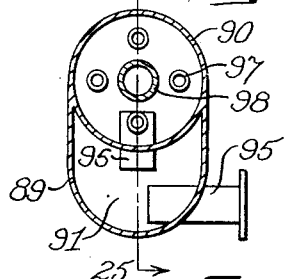
Fig. 26 is a section on line 26—26 of Fig. 25.

It is also possible to combine the general type of structure already described with further silencing devices as in Figs. 25 and 26. In this form a shell 89 U-shaped in cross section is welded to a cylindrical shell 90 so as to produce an inlet chamber 91 external to shell 90. The interior of shell 90 is divided by a partition 92 into an intermediate chamber 93 and an outlet chamber 94. Inlet pipes 95 enter the chamber 91, a transfer tube 96 connects that chamber with the intermediate chamber 93, transfer tubes 97 connect the latter with the outlet chamber 94, and a single outlet pipe 98 extends axially into the latter. The total area of each of the several sets of tubes is preferably substantially constant.

Figure 27:
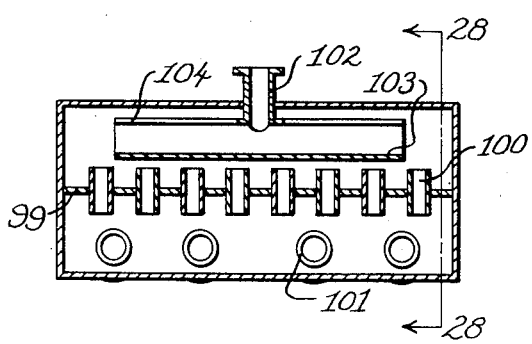
Fig. 27 is a longitudinal section, on line 27—27 of Fig. 28, of a further modification.
Figure 28:
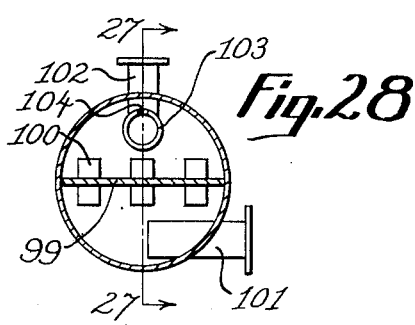
Fig. 28 is a section on line 28—28 of Fig. 27.

In the form shown in Figs. 27 and 28 the partition 99 is made flat and is traversed by a large number of transfer tubes 100. Inlet pipes 101 enter at one side of the partition, while a centrally entering exhaust pipe 102 at the other side is branched in T-shape to provide longitudinally extending open ended pipes 103 having slots 104 on the side opposite the transfer tubes.

We claim:

1. A manifold silencer comprising a generally cylindrical casing, a single plate-like partition extending transversely across the casing and longitudinally throughout its length so as to divide the casing into two adjacent chambers, a plurality of inlet conduits extending laterally through and beyond the wall of the casing a substantial distance into the adjacent one of said chambers, terminating with open ends at an intermediate point therein, and having direct communication with that chamber only, at least one outlet conduit extending laterally through and beyond the wall of the casing a substantial distance into the other of said chambers, terminating with an open end at an intermediate point therein, and having direct communication with that chamber only, and a plurality of transfer conduits extending through and a substantial distance beyond said partition and terminating with open ends at intermediate points in said two chambers out of alignment with said inlet and outlet conduits.

2. A manifold silencer comprising a generally cylindrical casing, a single plate-like partition extending transversely across the casing and longitudinally throughout its length so as to divide the casing into two adjacent chambers, a plurality of inlet conduits extending laterally through and beyond the wall of the casing a substantial distance into the adjacent one of said chambers, terminating with open ends at an intermediate point therein, and having direct communication with that chamber only, at least one outlet conduit extending laterally through and beyond the wall of the casing a substantial distance into the other of said chambers, terminating with an open end at an intermediate point therein, and having direct communication with that chamber only, and a plurality of substantially imperforate transfer conduits extending laterally through and a substantial distance beyond said partition and terminating with open ends at intermediate points in said two chambers out of alignment with said inlet and outlet conduits.

ROLAND B. BOURNE.
ARTHUR E. CHASE.

REFERENCES CITED

The following references are of record in the file of this patent:

UNITED STATES PATENTS

| Number | Name | Date |
| --- | --- | --- |
| 2,078,754 | Day | Apr. 27, 1937 |
| 2,353,036 | Hoyle | July 4, 1944 |
| 2,361,133 | Sprouse | Oct. 24, 1944 |

FOREIGN PATENTS

| Number | Country | Date |
| --- | --- | --- |
| 626,321 | Germany | Feb. 24, 1936 |
| 662,367 | Germany | July 11, 1938 |